United States Patent

[11] 3,594,026

[72] Inventor Leopold F. Schmid
Pischekstrasse 49, 7000 Stuttgart-O, Germany
[21] Appl. No. 888
[22] Filed Jan. 6, 1970
[45] Patented July 20, 1971
[32] Priority Jan. 8, 1969, Mar. 31, 1969, Apr. 2, 1969, Apr. 2, 1969
[33] Germany
[31] P 19 00 642.9, P 19 16 451.3, P 19 16 832.2, and P 19 16 833.3

[54] BALL JOINT, ESPECIALLY FOR STEERING DEVICES AND WHEEL SUSPENSIONS OF MOTOR VEHICLES
7 Claims, 22 Drawing Figs.

[52] U.S. Cl. ................................................. 287/87, 29/149.5
[51] Int. Cl. ....................................................... F16c 11/06
[50] Field of Search ............................................ 287/87, 90 A, 90 C; 29/149.5 B, 441

[56] References Cited
UNITED STATES PATENTS
1,132,123 3/1915 Royer et al. ................. 287/90 X
3,007,720 11/1961 Breitenstein ................. 287/87 X

*Primary Examiner*—David J. Williamowsky
*Assistant Examiner*—Andrew V. Kundrat
*Attorney*—Walter Bekcer ABSTRACT: For use in a ball joint, especially for connecting rods, steering devices and wheel suspensions of motor vehicles, a joint unit and method of making same, according to which a section of deformable tubular material has one end portion formed into a hollow ball head while by means of a constriction it is separated from a hollow shank portion forming an extension of said head and constriction and together with said head forming a single integral piece with different cross-sectional diameters, the thickness of cross-sectional areas of said ball head and said extension including said constriction increasing proportionally with the decrease in the outer diameter of said cross-sectional areas and vice versa.

PATENTED JUL 20 1971

INVENTOR.
Leopold F. Schmid
BY
Walter Becker

INVENTOR.
Leopold F. Schmid

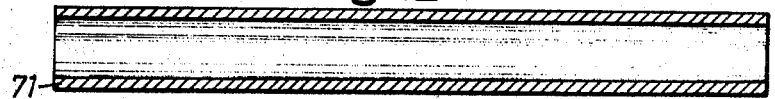
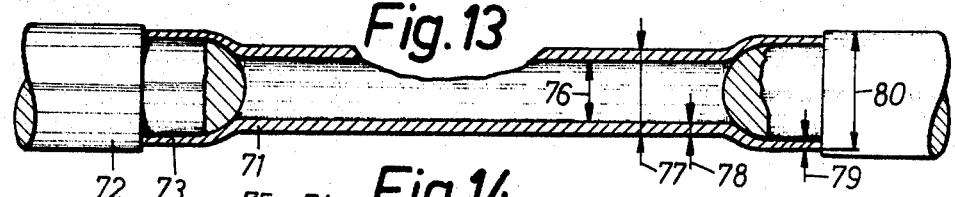
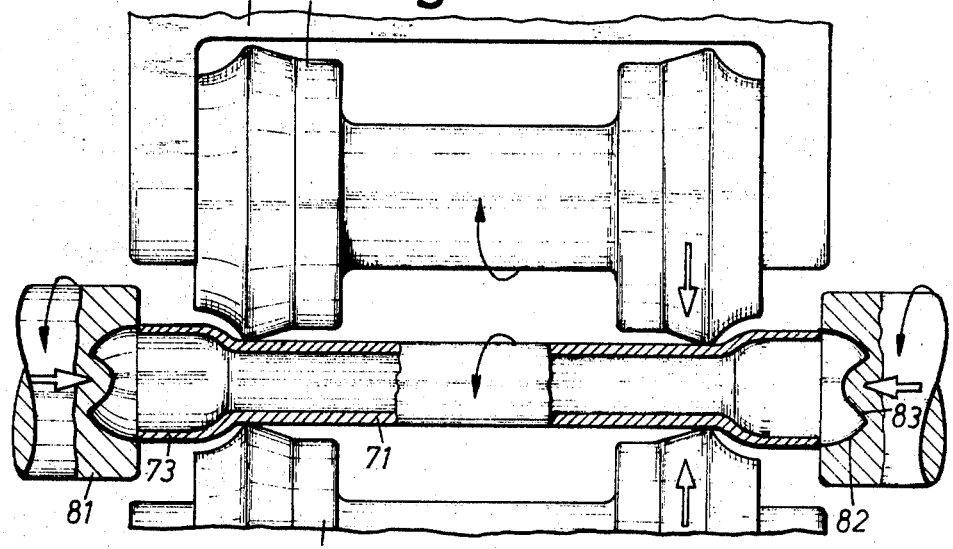
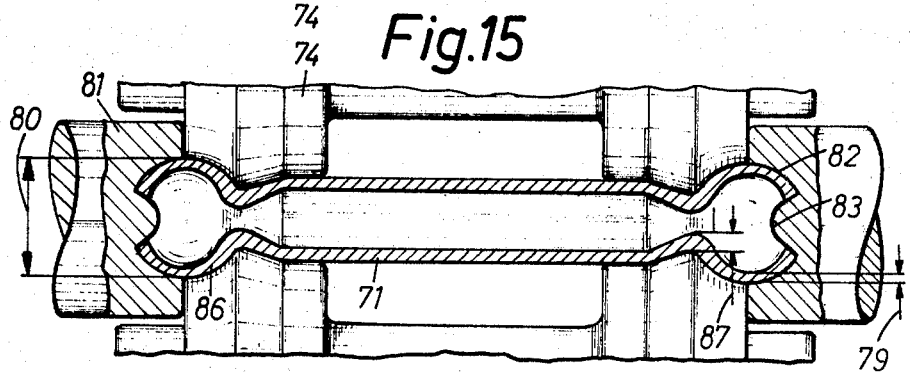
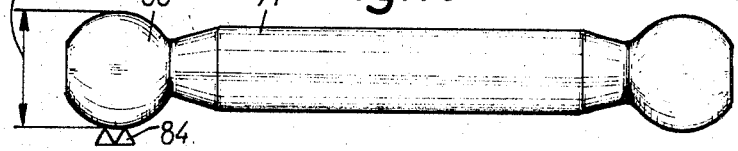

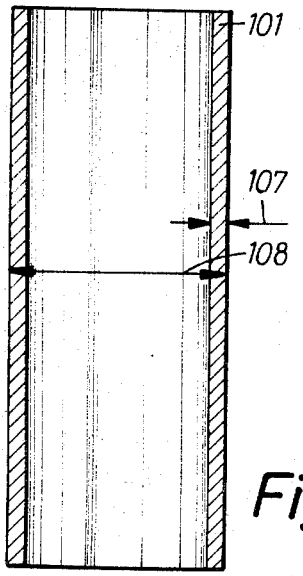
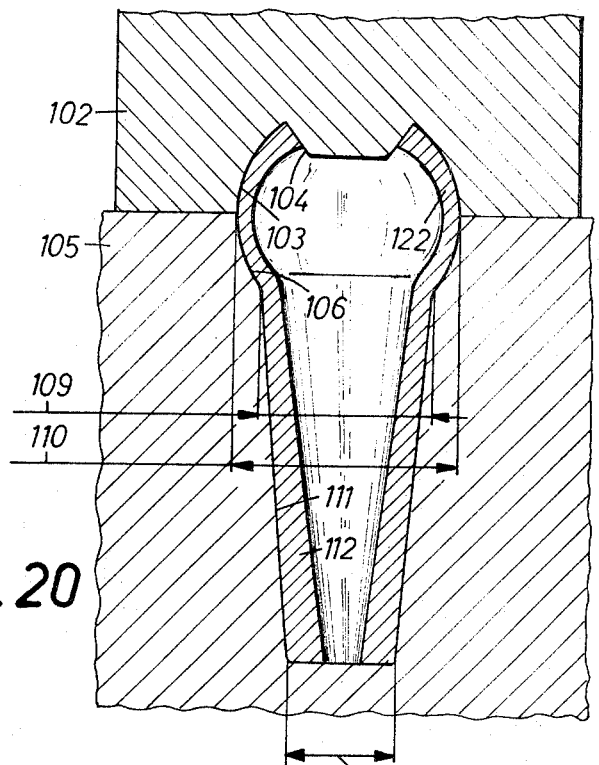
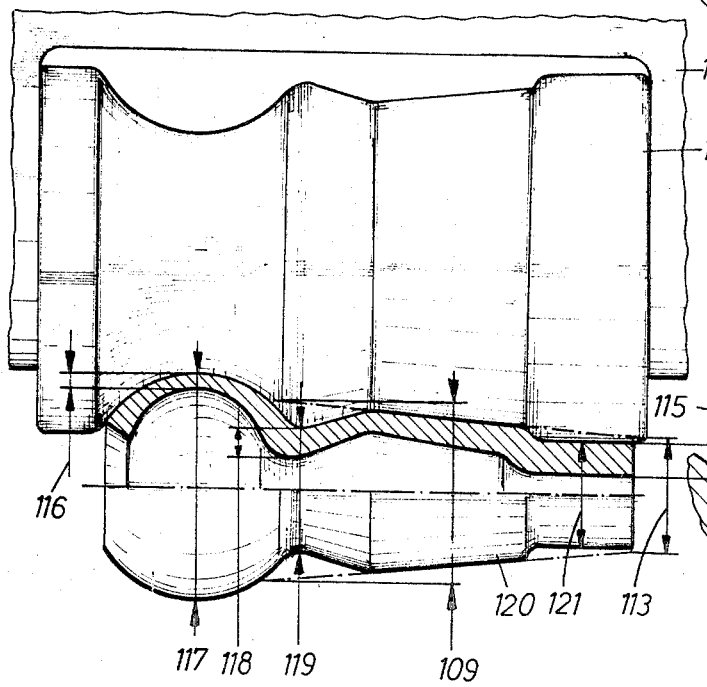
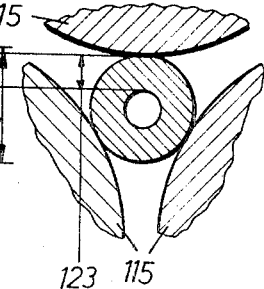

BALL JOINT, ESPECIALLY FOR STEERING DEVICES AND WHEEL SUSPENSIONS OF MOTOR VEHICLES

The present invention relates to a ball joint for connecting bars, especially for steering devices and wheel suspensions of motor vehicles with a ball pin or ball stud in the form of a hollow body.

Ball joints for steering devices and wheel suspensions form some of the most important structural elements of a motor vehicle. Therefore, they must on one hand have a high strength because considerable forces acting upon the same, and because a breakage of these structural elements can have catastrophic consequences. On the other hand such structural elements must be as light as possible because their weight, depending on their position, belongs partially or entirely to the noncushioned masses, and the noncushioned masses of a motor vehicle must be as small as possible.

It is, therefore, an object of the present invention to provide a ball joint for connecting bars with a ball stud in the form of a hollow body, which ball joint will be less expensive than heretofore known designs while having the same strength and being able to transmit the same forces.

This object and other objects and advantages of the invention will appear more clearly from the following specification, in connection with the accompanying drawings, in which:

FIG. 12 illustrates a longitudinal section through a pipe from which is made a tie bar having both ends thereof provided with a ball stud according to the invention.

FIG. 13 shows the end phase of the widening of the ends of the pipe according to FIG. 12.

FIG. 14 illustrates the start of a deformation of the pipe according to FIG. 13 without a cutting operation, by means of profile rollers and upsetting heads.

FIG. 15 represents the end phase of the deformation of FIG. 14 without a cutting operation.

FIG. 16 shows the finished tie bar provided at both ends with a ball stud.

FIG. 19 illustrates a longitudinal section through a pipe from which the ball stud preformed by an upsetting operation is made.

FIG. 20 represents the end phase of the upsetting operation by means of which the pipe according to FIG. 19 is by a two-sectional forging die preformed to a hollow body with a ball-shaped head and a conical shank.

FIG. 21 shows the end phase of the deforming operation by which the pipe of FIG. 20 is formed by means of three profile rollers to a ball stud.

FIG. 22 represents a section through the extension pin of the ball stud according to FIG. 21.

Figure 1:
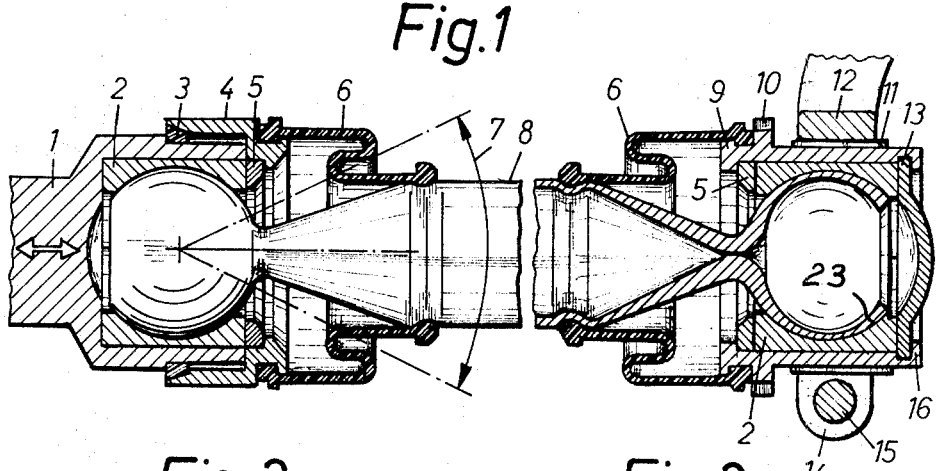
FIG. 1 illustrates a connecting bar for a steering device, which bar has both ends provided with a ball joint according to the present invention.
Figure 2:
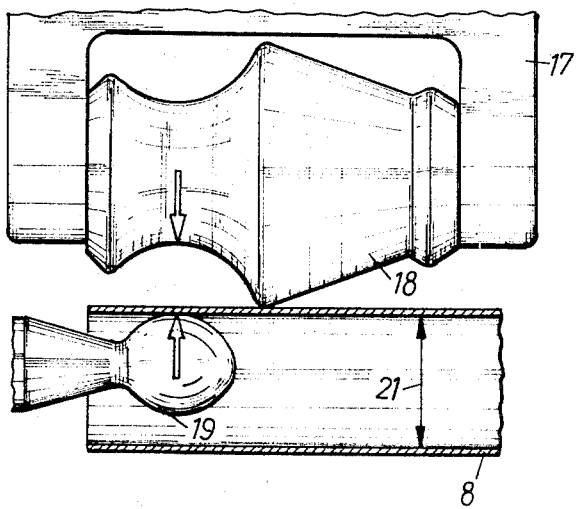
FIG. 2 shows the start of a deformation by a noncutting process of a pipe to form a ball stud according to FIG. 1.
Figure 3:
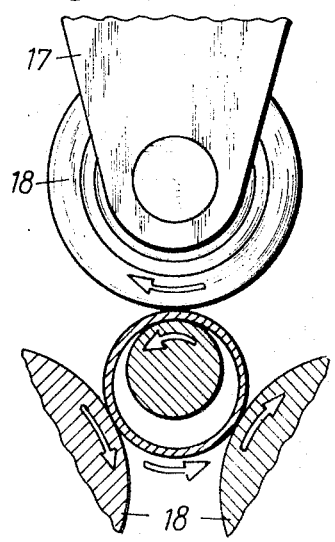
FIG. 3 is partially an end view of FIG. 2 and partially a section.

The ball joint according to the present invention is characterized primarily in that the wall thickness of the ball stud varies along the axis thereof in such a way that with the decrease in the outer diameter the wall thickness increases proportionally so that a body is formed with has substantially constant strength and resistance against bending, pull and pressure.

According to a further feature of the invention, the different wall thicknesses of the ball stud are produced by noncutting operations and, more specifically, by deforming the pipe by means of profile rollers which act upon the outer diameter of the pipe. The outer diameter of the pipe is, prior to the noncutting deformation, shorter than the outer diameter of the ball of the ball stud. The widening of the ball of the ball stud is effected by means of a profile roller which acts upon the inner diameter of the pipe and which simultaneously operates with those profile rollers which act upon the outer diameter of the pipe. The bottom of the inner chamber of the ball is, in conformity with the present invention, closed in a watertight manner. This watertight closure can be effected by a closure member of an elastically deformable material such as rubber. The watertight closure may also be formed by reducing the inner diameter of the pipe to zero. Ball studs with the above mentioned properties may be provided at both ends of a pipe which is employed as connecting rod.

In order to further develop a certain type of wheel suspension which is more and more employed for suspending the front wheels of passenger cars, while employing a ball joint according to the present invention, it is suggested to form the ball stud of the ball joint at the lower end of the hydraulic shock absorber associated with the wheel, by deforming the outer pipe of the hydraulic shock absorber in a noncutting manner.

In this way there is obtained a front wheel mounting for passenger cars, according to which the ball stud for the journaling of the wheel is connected to the outer pipe of the hydraulic shock absorber associated with this wheel. This pipe has its lower end journaled by means of a ball joint in a lever which is rotatably connected to the frame of the motor vehicle. The advantage of this further development according to the invention consists in that the wheel suspension will be lighter while retaining the same strength and can be produced at lower cost than heretofore known designs of the type involved.

In order to improve the noncutting deformation of a pipe to a ball stud of substantially the same strength and resistance against bending pull and pressure, so that a particularly homogeneous texture of the material will be obtained, it is suggested according to the invention to deform without cutting the said pipe in addition to profile rollers acting upon its outer diameter, also by upsetting heads acting upon the ends of said pipe. In this connection, an upsetting head with a plane upsetting surface may act upon one end of the pipe whereas an upsetting head with a concave ball-shaped upsetting surface acts upon the other end of the pipe. However, if desired, one upsetting head each with a concave ball-shaped upsetting surface may act upon both ends of the pipe. The action of the profile rollers upon the outer diameter of the pipe and the action of the upsetting heads upon the ends of the pipe may occur simultaneously.

In view of the thus described arrangement, the manufacturing process becomes even still more economical, and it is possible to design the opening on the ball even smaller.

For purposes of further developing and improving the invention to such an extent that the opening on the ball can be kept to a minimum and in order to simplify the noncutting deformation considerably, especially with large ball heads for heavy trucks and with a particularly strong constriction on the ball head, it is suggested in conformity with the invention to subject the pipe to an upsetting operation prior to the action of the profile rollers on the pipe, whereby the pipe is preformed to a hollow body with a ball-shaped head and a conical shank. The upsetting operation is effected by means of a two-sectional die according to which a die portion has a concave ball surface whereas the other die portion has a concave ball and a conical bore. From the concave ball surface of one die portion there may protrude a protrusion in order to guide the end face of the pipe.

Figure 4:
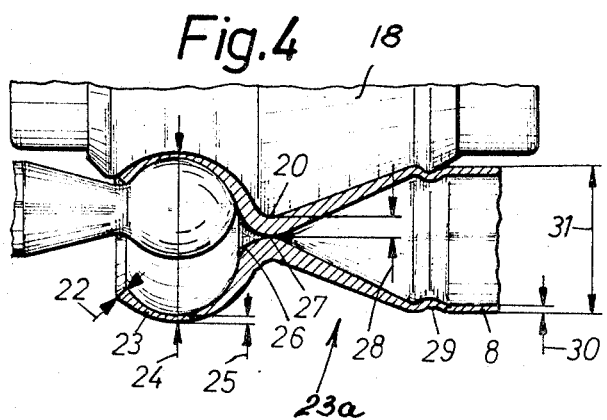
FIG. 4 shows the end of the deformation by a noncutting operation of the ball stud.
Figure 5:
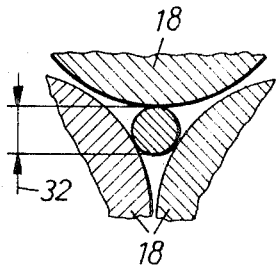
FIG. 5 is a partial cross section through the narrowest area of the ball stud according to FIG. 4
Figure 6:
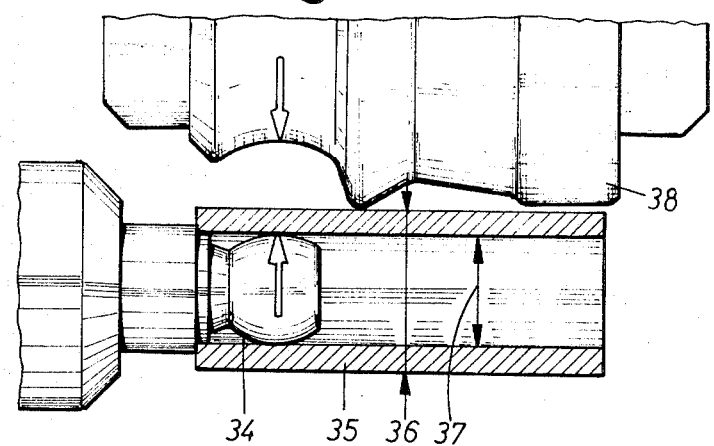
FIG. 6 illustrates the start of a deformation by a noncutting operation of a modified ball stud according to the invention with a greater transmitting force, for which a shorter pipe is employed with a greater wall thickness.
Figure 7:
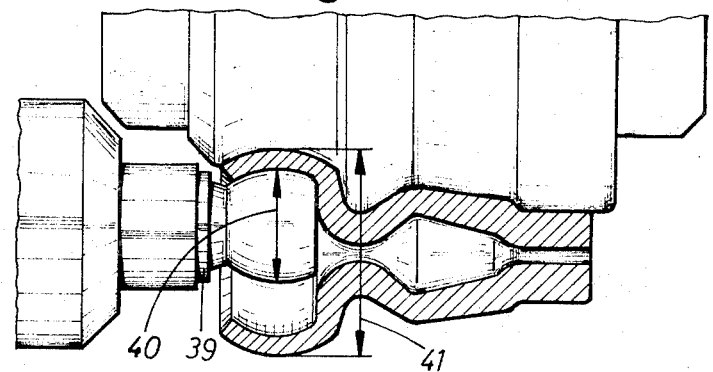
FIG. 7 illustrates the end of the deformation process of the pipe according to FIG. 6.

Referring now to the drawings in detail, and FIG. 1 in particular, it will be seen that the steering gear or steering mechanism 1 of a motor vehicle which is designed, for instance, as a rack steering mechanism, is by means of a connecting rod 8 connected to a steering lever 12, which in its turn is connected to the axle journal or steering knuckle. This connecting bar 8 has both ends provided with one ball head 23 each (FIG. 4). The outer diameter 24 of the ball is greater than the outer diameter 31 of the tubular connecting bar 8. The ball heads 23 are journaled in divided bearing cups 2 which are axially held by likewise divided rings 5. The rings 5 are in their turn held by a box nut 4 which is secured by a safety ring 3 of an elastically deformable material so as to be prevented from turning. The connection with the steering lever 12 connected to the axle journal or steering knuckle is effected by means of a bushing 9 having a thread 11 for fine adjustment. The bushing 9 is after effected fine adjustment secured in its position by means of a clamping connection having a slot 14 and a screw 15. A cover disc 13 absorbs the outwardly directed forces by means of the rolled-in ends 16 of the bushing 9. By means of grooves 10, the bushing 9 is turned during the fine adjustment. Sleeves 6 prevent dirt from entering and also prevent the lubricant from leaving the bearing. FIG. 1 illustrates the large pivoting angle 7 of the ball joints which angle amounts to about 50°.

The manufacture of the ball stud 23a at the ends of the connecting bar 8 is effected by means of noncutting operations deforming the ends of the connecting rod 8 after said ends have been heated up. To this end, three outer profile rollers 18 become effective which are rotatably journaled in supports 17 and are controlled radially inwardly, and by means of inner profile rollers 19 which are controlled radially outwardly. In view of this noncutting deformation which can be carried out by automatically operating machine tools in a very economical manner, uneven wall thicknesses 22, 25, 28 and 30 of the ball stud 23a are obtained. The wall thickness proportionally increases with the decrease in the outer diameter so that a body is obtained which has substantially the same strength and the resistance against bending pull and pressure. At the largest constriction 20 of the ball stud 23a, which constriction has the smallest diameter 32, the wall thickness 28 is the greatest. The greatest outer diameter 24 of the ball 23 has the smallest wall thickness 25. The ball bottom 26 is closed in a watertight manner by the reduction in the inner diameter 21 of the connecting rod 8 up to the contact at the area 27 so that the lubricant for the ball joint cannot flow out even if it is very thin. At the merging area of the conical portion of the ball stud 23a with the nondeformed central portion of the connecting bar 8 there is provided an annular groove 29 which serves for axially arresting the sleeves 6.

Figure 8:
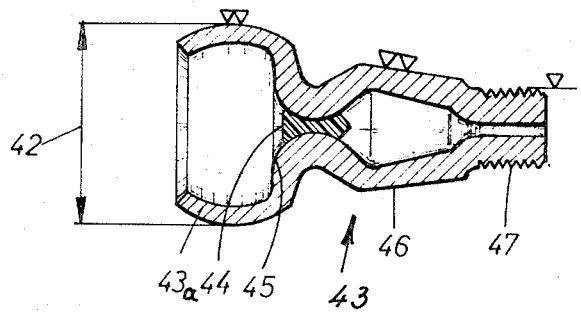
FIG. 8 shows a ball stud according to FIG. 7 after the ball and the conical shank have been machined and the thread has been cut.

In contrast to the ball stud 23a according to FIG. 1 which is designed directly at the tubular connecting bar 8, the ball stud 43 of FIG. 8 is provided with a cone 46 and with a thread 47 by means of which it may be detachably connected to a connecting bar. The ball bottom 45 is closed in a watertight manner by a closure member 44 of an elastically deformable material such as rubber.

According to this second embodiment, the inner profile roller 34 has a short centering seat 39 so that the heated blank 35 in the form of a pipe can, with its outer diameter 36, be centered at the start of the noncutting deforming operation. The diameter of the centering seat 39 and the outer diameter 40 of the profile roller 34 are by 0.1 millimeters shorter than the inner diameter 37 of the blank 35. The outer diameter 42 of the finished ball 43a of stud 43 is smaller than the outer diameter 41 by the extent of the grinding allowance. The profile rollers 38 (usually three) have a cylindrical part by means of which the extension neck of the ball stud is formed, which neck is provided with a thread 47.

Figure 11:
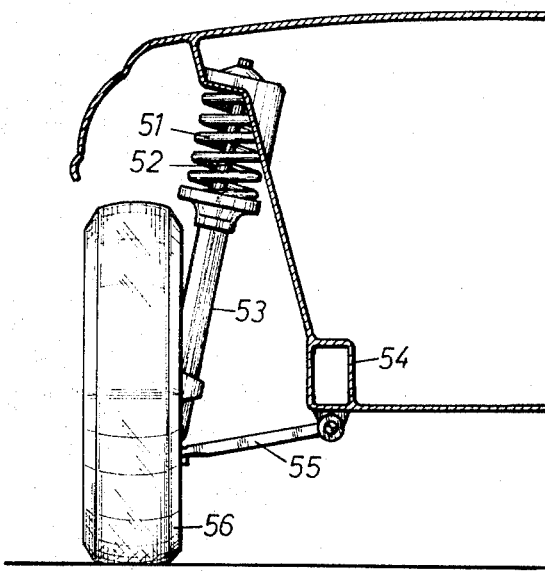
FIG. 11 shows the suspension for a front wheel of a passenger car with a hydraulic shock absorber according to FIGS. 9 and 10.
Figure 10:
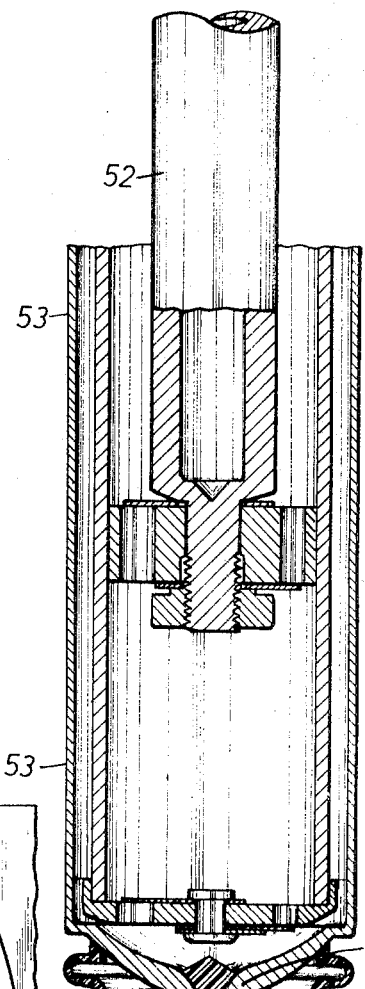
FIG. 10 is a longitudinal section through the lower portion of the shock absorber for a medium heavy passenger car.
Figure 9:
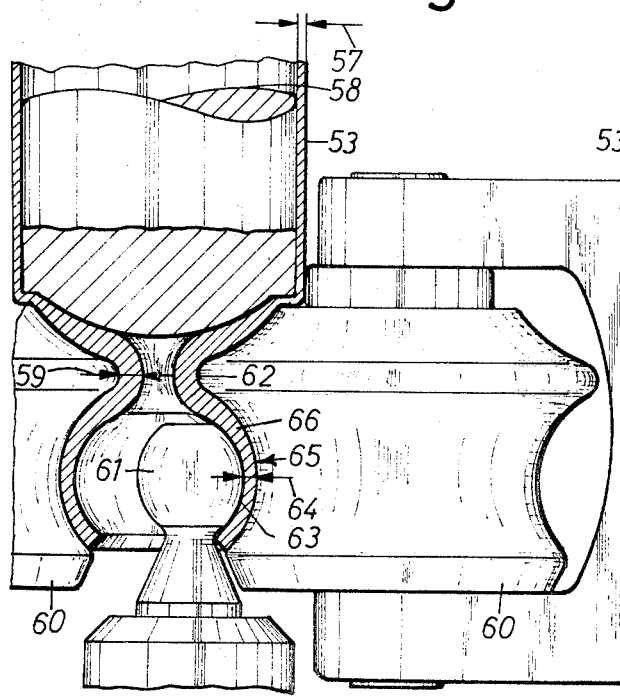
FIG. 9 illustrates the end phase of the deformation by a noncutting operation of the lower end of the outer pipe of a shock absorber associated with a front wheel for forming a ball stud according to the invention.

FIGS. 9—11 illustrate a further embodiment of the invention according to which the outer pipe 53 of a shock absorber is formed to a ball stud 66 according to the invention.

The front wheel 56 of a vehicle which by means of a helical spring 51 is cushioned relative to the frame 54 is journaled on a ball stud 66 which is connected to the outer pipe 53 of the hydraulic shock absorber associated with the front wheel 56. The connection of the hydraulic shock absorber to the frame 54 of the vehicle is effected at the top through the intervention of a piston rod 52 and at the bottom through the intervention of a lever 55. For mounting the ball stud 66 in the lever 55 there is provided a joint housing 68 having arranged therein a two-sectional bearing cup 67 which is held axially by a cover 70a. The seal of the ball joint is effected by means of a sleeve 70. At the constriction 62 of the ball stud 66 there is provided a closure 69 of rubber which prevents the shock absorber fluid from escaping.

For purposes of producing the ball stud 66 according to the invention, the lower end of pipe 53 is, by means of three profile rollers 60 acting upon the outer diameter 65, deformed in a noncutting operation and is further deformed in a noncutting operation by means of a profile roller 61 which acts upon the inner diameter 63. During this deformation, which is facilitated by a previous heating up of the pipe ends, and which can be carried out in an effective manner on automatically operating machine tools, the wall thickness 57 of the pipe 53 is so changed that the wall thickness will proportionally increase with the decrease in the outer diameter. Due to the fact that the wall thicknesses 59, 64 are greater than the wall thickness 57, a body of substantially uniform strength and resistance against bending pull and pressure is obtained. During the noncutting deformation, an auxiliary mandrel 58 is employed which is located in the interior of the pipe 53.

The embodiments illustrated in FIGS. 12—16 and 17 as well as in 18 concern a further development of the principle according to the invention. With the said embodiments, during the noncutting deforming operation of a pipe to a ball stud, a particular homogeneous texture of the material and thereby a particularly high strength will be obtained.

The pipe 71, the outer diameter 77 of which is shorter than the outer diameter 80 of the ball to be produced of the ball stud 86, is first by means of mandrels 72 acting upon its inner diameter 76, widened to such an extent that the pipe ends 73 will have an outer diameter 80. During this operation, the wall thickness 78 of the pipe 71 decreases at the ends 73 to the thinner wall thickness 79. During the next operation, the pipe 71 which has been widened at the ends is, by means of three profile rollers 74 rotatably journaled in supports 75—said rollers 74 acting upon the outer diameter 77—and by upsetting heads 81 acting upon the pipe ends deformed by noncutting operation to form a tie bar which has both ends provided with a ball head according to the invention. The wall thicknesses 78, 79 and 87 of the ball stud 86 increase with the decrease of the outer diameter so that a body is obtained which has substantially uniform strength and resistance against bending pull and pressure.

The upsetting heads 81 have a concave ball-shaped upsetting surface 82 from which a protrusion 83 extends. The outer diameter 80 of the ball of the ball stud 86 is by a few tenths of a millimeter greater than the outer diameter 85 in finished condition. The machining to the finished dimension 84 may be effected either by grinding or cold calibrating.

Figure 17:
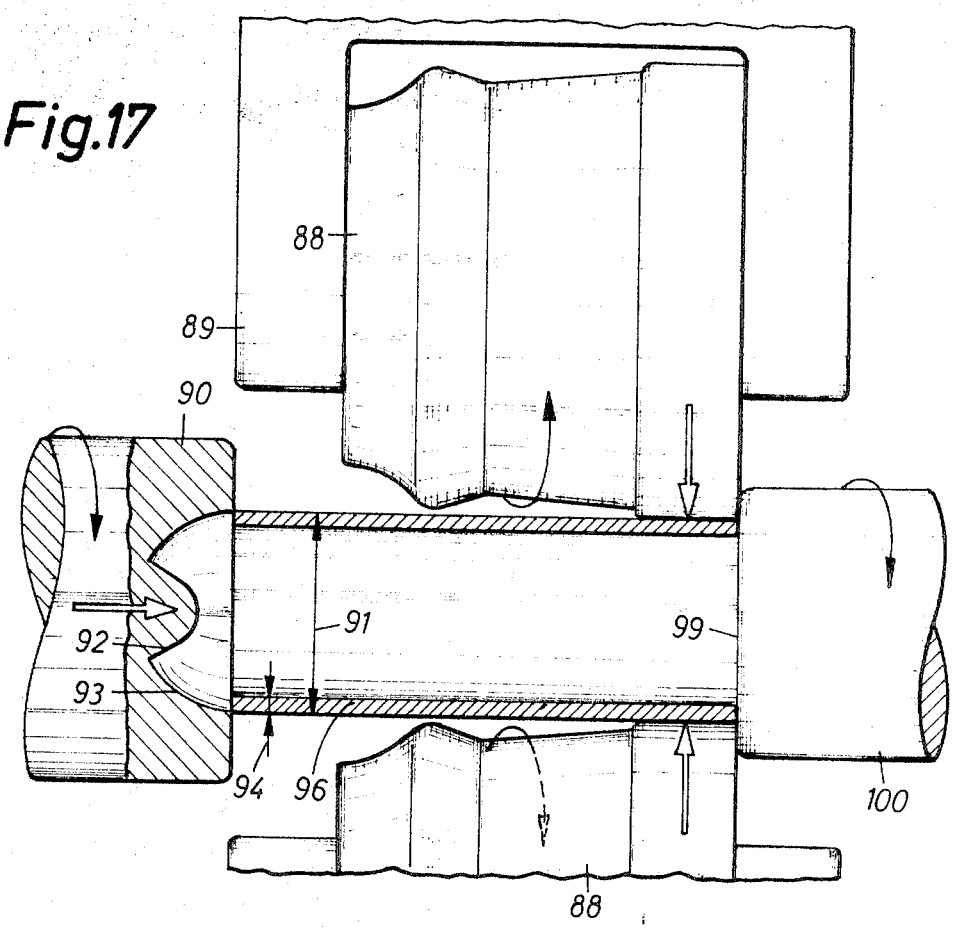
FIG. 17 illustrates the start of a noncutting deformation of a short pipe to form a ball stud according to the invention by means of profile rollers and upsetting heads.
Figure 18:
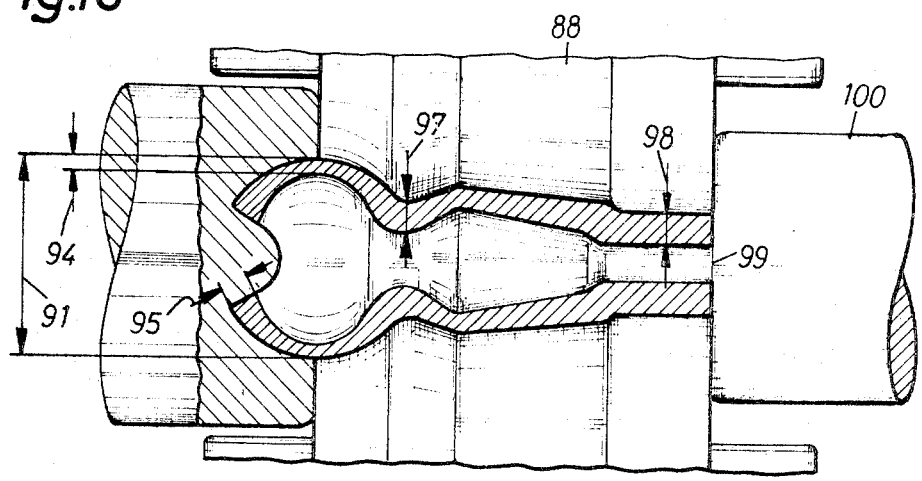
FIG. 18 shows the end phase of the deforming operation of FIG. 17.

The pipe 96 in FIG. 17 is, by means of three profile rollers 88 which are rotatably journaled in supports 89 and which act upon the outer diameter 91 of the pipe 96, and by means of upsetting heads 90 and 100 acting upon the ends, deformed by a noncutting operation to form a ball stud. The wall thicknesses 94, 95, 97 and 98 of the ball stud increase with the decrease in the outer diameter so that a body is obtained which has substantially uniform strength and resistance against bending pull and pressure. The upsetting head 90 is provided with a concave ball-shaped upsetting surface 93 from which a protrusion 92 extends. The upsetting head 100 has a plane upsetting surface 99.

The last embodiment according to FIGS. 19—22 illustrates the manufacture of a ball stud according to the invention, according to which the pipe 101 is, prior to the action of the profile rollers 115 subjected to an upsetting operation.

To this end, the pipe 101 is deformed in a two-sectional forging die. The die part 102 has a concave ball surface 103 from which protrudes a protrusion 104. The other die part 105 is provided with a concave ball surface 106 and a conical bore 111. The hollow body produced by means of the die parts 102 and 105 forming a die, has a ball-shaped head 122 and a conical shank 112. The diameter 110 of the concave ball surfaces 103 and 106 is slightly greater or longer than the outer diameter 108 of pipe 101.

The end diameters 109 and 113 of the conical bore 111 of the die part 105 are likewise shown in FIG. 21. By means of three profile rollers 115 rotatably journaled in holding members 114, the pipe 101 preformed in the forging die is deformed without a cutting operation to a ball stud 120 according to the invention. The ball stud 120 is a hollow body whose wall thicknesses 116, 118 and 123 differ and, more specifically, in such a manner that with the decrease in the outer diameters 117, 119 and 121 the wall thicknesses increase so that a body is formed which has substantially uniform strength and resistance against bending pull and pressure. The outer diameter 117 is slightly shorter than the outer diameter 110 so that also the wall thickness 116 is slightly greater than the wall thickness 107 of pipe 101.

The advantages obtained by the present invention are seen primarily in that due to the varying wall thicknesses of the ball stud, which wall thicknesses increase proportionally with the decrease in the outer diameter so that a body of substantially constant strength and resistance against bending pull and pressure is obtained while a maximum strength is assured at a minimum weight. The noncutting deformation of a pipe employed for this purpose can be carried out economically in automatic machine tools. Such ball stud produced in this manner may be designed at its lower end of the outer pipe of a hydraulic shock absorber associated with the front wheel so that at minimum production costs and with the saving of special structural elements, with such front wheel suspension there will be assured a maximum strength at a minimum weight. With this embodiment, in contrast to heretofore known wheel suspensions, the number of structural elements is reduced and space is gained which is particularly valuable in this area. In view of the simultaneous action of profile rollers and upsetting heads according to the further embodiments of the invention, a particularly homogeneous texture of the material is assured and thereby a particularly high strength will be obtained with the manufacture of a ball stud according to the invention. In this connection a further advantage may be mentioned which consists in that the opening in the ball may be made smaller. If the ball heads according to the invention are to be employed in particular for heavy trucks, and have a particularly strong contraction at the ball head, it is expedient by means of an upsetting operation in the forging die to preform a ball-shaped head and a conical stud and subsequently to carry out the noncutting deformation b means of profile rollers. In this way, again a particularly homogeneous texture of the working material and thereby a particularly high strength with a minimum opening at the ball is obtained. At the same time the noncutting deformation is simplified by the profile rollers.

It is, of course, to be understood that the present invention is, by no means, limited to the particular showing in the drawings, but also comprises any modifications within the scope of the appended claims.

What I claim is:

1. For use in a ball joint, especially for connecting rods, steering devices and wheel suspensions of motor vehicles, a joint unit which includes: a hollow ball head and a tubular extension connected to and integral with said ball head, the connecting area between said hollow ball head and said tubular extension forming a constriction between said ball head and said extension, the wall thickness of cross-sectional areas of said ball head and said tubular extension increasing proportionally with the decrease in the outer diameter of said cross-sectional areas and vice versa for the length of said ball head and the length of said tubular extension to at least the maximum diameter thereof adjacent the ball head.

2. A joint unit according to claim 1, in which the maximum cross-sectional diameter of said tubular extension is less than the outer diameter of said ball head.

3. A joint unit according to claim 1, which includes means arranged at said constriction and sealing said ball head in a watertight manner relative to said tubular extension.

4. A joint unit according to claim 3, in which said means sealing said ball head in a watertight manner relative to said tubular extension includes a stopper of elastically deformable material.

5. A joint unit according to claim 1, in which said constriction is such that the interior wall portions thereof engage each other in a substantially watertight manner.

6. A joint unit according to claim 1, in which said tubular extension has a hollow ball head at both ends thereof.

7. A joint unit according to claim 1, in which said tubular extension forms the outer pipe of a hydraulic shock absorber.